(12) United States Patent
Berkovich et al.

(10) Patent No.: US 10,341,982 B2
(45) Date of Patent: Jul. 2, 2019

(54) TECHNIQUE AND SYSTEM OF POSITIONING A MOBILE TERMINAL INDOORS

(71) Applicant: INVENSENSE INTERNATIONAL, INC., George Town, Grand Cayman (KY)

(72) Inventors: Gennadii Mihajlovich Berkovich, Calgary (CA); Leonid Viktorovich Purto, Moscow (RU); Vladimir Aleksandrovich Sviridenko, Moscow (RU)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 15/523,207

(22) PCT Filed: Oct. 28, 2014

(86) PCT No.: PCT/RU2014/000822
§ 371 (c)(1),
(2) Date: Apr. 28, 2017

(87) PCT Pub. No.: WO2016/068742
PCT Pub. Date: May 6, 2016

(65) Prior Publication Data
US 2018/0288728 A1    Oct. 4, 2018

(51) Int. Cl.
*H04W 64/00*     (2009.01)
*G01S 19/24*     (2010.01)
(Continued)

(52) U.S. Cl.
CPC ............ *H04W 64/003* (2013.01); *G01S 5/00* (2013.01); *G01S 19/24* (2013.01); *G01S 19/49* (2013.01);
(Continued)

(58) Field of Classification Search
CPC ......... H04W 4/80; H04W 88/08; G05D 1/028
(Continued)

(56) References Cited

U.S. PATENT DOCUMENTS

| | | | |
|---|---|---|---|
| 2003/0114169 A1* | 6/2003 | Okamura et al. | H04Q 7/20 455/456 |
| 2010/0095251 A1* | 4/2010 | Dunko | G06F 3/01 715/863 |
| 2015/0080020 A1* | 3/2015 | Edge | H04W 4/02 455/456.1 |

* cited by examiner

*Primary Examiner* — Kiet M Doan
(74) *Attorney, Agent, or Firm* — Bay Area Technology Law Group PC (57) ABSTRACT

The technique and the system may be used for indoor positioning, where signals of navigation satellites are not available. In accordance with the technique patterns identifying location of the mobile terminal in a specific position may be detected, on the basis of data acquired from at least one inertial and non-inertial sensors in the process of movement of at least one mobile terminal; the path of movement of the above mobile terminal may be detected and saved in the local coordinate system associated with the above position, as well as data acquired from non-inertial sensors; statistically averaged parameters of conversion of local coordinate system of the mobile terminal may be generated in the positions detected in the process of terminal movement; at least one map of distribution of output values of non-inertial sensors may be prepared on the basis of data acquired at the previous step; the position of the above mobile terminal may be detected on the basis of data acquired at the previous step. The system may include a set of sensors of mobile terminal, a computer, a probability computation module, a module for selection of patterns, a data storage package and a coordinate converter.

17 Claims, 3 Drawing Sheets

(51) Int. Cl.
  *H04W 4/33* (2018.01)
  *G01S 19/49* (2010.01)
  *H04W 4/02* (2018.01)
  *G01S 5/00* (2006.01)
(52) U.S. Cl.
  CPC .............. *H04W 4/025* (2013.01); *H04W 4/33* (2018.02); *H04W 64/00* (2013.01)
(58) Field of Classification Search
  USPC .................. 455/456.1, 457, 456.2; 370/252; 701/533, 863; 342/357.3; 340/669, 340/539.13
  See application file for complete search history.

TECHNIQUE AND SYSTEM OF POSITIONING A MOBILE TERMINAL INDOORS

CROSS REFERENCE TO RELATED APPLICATIONS

This application claims priority from and benefit of PCT Patent Application Serial No. PCT/RU2014/000822, filed Oct. 28, 2014, which is entitled "TECHNIQUE AND SYSTEM OF POSITIONING A MOBILE TERMINAL INDOORS."

FIELD OF THE PRESENT DISCLOSURE

The invention is related to positioning, more specifically, to indoor positioning.

BACKGROUND

Positioning with navigation satellite signals is well-proven in open localities, but it is practically incapable indoors. The cause is weakening of the satellite signal following its passing through walls, ceilings and floors of the buildings to such an extent that its level is inadequate for receipt by the satellite receiver in most cases. Even in the cases when the satellite signal is not as weak, it is attenuated due to reflections from indoor walls and other things (effect of multi-beam propagation of radio-waves), this results in intolerably large navigation errors.

The prior art knows technical solution U.S. Pat. No. 6,323,807, Indoor Navigation with Wearable Passive Sensors, Mitsubishi Electric Research Laboratories, published on 27 Nov. 2001. This solution describes the technique of indoor navigation with alternative, not satellite, sources of navigation data, in accordance with this solution, first a map of conformity between the positions with known coordinates of the positioned object, which may be a mobile terminal, and the data obtained in these positions from non-inertial sensors, is issued, subsequently, in the process of further flow, similar non-inertial data are acquired in unknown positions, compared with data obtained in the known positions, the known position is detected with data which are as close as possible to data acquired in the unknown position, whereafter the unknown position of the mobile terminal may be considered as equal to detected known position. Non-inertial data acquired in the time moments when the mobile terminal position was known together with information on these positions may generate a special map or data base different from standard indoor environment layout solely with a specific nature of mapped data. Such maps are commonly referred to as the 'fingerprinting'. Data acquired from non-inertial sensors in the reviewed technique may be Wi-Fi signals obtained from access points observed by the mobile terminal, magnetic detector readings, images obtained from video-camera of the mobile telephone and any other data available for the mobile device allowing for direct or indirect detection of user's location. To increase accuracy of positioning, the described technique may allow for usage of data obtained from inertial sensors based on dead reckoning (the term Dead Reckoning). The weak point of this technique may be required full mapping of indoor environments which is expensive and not always practicable. The other disadvantage of this technique may be required indication of coordinates of known positions in the process of training which requires utilization of the other, more highly precise technique for detection of mobile terminal coordinates in the indoor environments.

Simultaneously with positioning technique, the said technical solution describes the positioning device comprising passive sensors of the mobile terminal, a portable computer and a module for estimation of probability of conformity of the unknown position with one of the known positions. The system described in this technical solution is the closest to the proposed one and is selected as a prototype.

The technical solution, described in application WO2013038005, Method for Localization and Mapping of Pedestrians or Robots Using Wireless Access Points, Deutsches Zentrum fuer Luft- and Raumfahrt e. V., published on 21 Mar. 2013, is known. This application describes the technique for mapping and subsequent indoor positioning with Dead Reckoning qualitative algorithm based upon inertial sensors and an odometer. The advantage of this technique may be independent detection of positions in the process of acquisition of data for mapping. The disadvantage of the described technical solution may be utilization of special equipment in the process of mapping data acquisition, as well as required performance of mapping activities, expensive and not always practicable.

The technical solution described in application US20130293416A1, Apparatus and Method for Indoor Positioning, Texas Instruments Incorporated, published on 7 Nov. 2013, is known. The specified application describes the technique for mapping and indoor positioning in accordance with which the known positions are detected with satellite signals prior to enter the indoor environments, subsequently, indoor positions are computed with inertial sensors, data obtained from non-inertial sensors are entered for these positions into the data base, then in the process of subsequent flow, coordinates of the mobile terminal in the unknown position are computed by comparison of new non-inertial data with data shown in the map. The advantage of this technique may be full automation and practicability of mapping without any additional equipment. Mapping may be implemented by people in the process of every-day movement. In theory, this technique, called 'crowd-sourcing' in the literature may allow for mapping of all indoor environments, but not only individual ones, where special activities have been performed with the above techniques. The disadvantage of this approach may be degradation of accuracy of the position computed with inertial sensors as far as the mobile terminal moves indoors, as well as lack of sufficient information for estimation of dead reckoning accuracy in accordance with the data obtained from inertial sensors. As a consequence, much non-inertial data with positions detected not accurately get into the map, this makes the mapping process more complicated and subsequent positioning less accurate.

The technical solution, described in application WO2013165391A1, Simultaneous Localization and Mapping Using Spatial and Temporal Coherence for Indoor Location, Intel Corporation, published on 7 Nov. 2013, is known. This application describes the technique for mapping with users' occasional walking tiles forming the closed paths. To detect path self-crossing (return to already passed position in the patent terms), time moments when new data obtained from non-inertial sensors (hereinafter referred to as the 'non-inertial' data) are correlated adequately with similar data obtained some time ago, are searched for, as well as time moments when the path computed with the data obtained from inertial sensors (hereinafter referred to as the 'inertial' data) crosses itself or contains adjacent areas are searched for, and should the moments of proposed self-crossing computed in accordance with non-inertial data coincide with moments computed with inertial data, a conclusion on fitness of acquired navigation data for subsequent analysis is made. This analysis may consist of updating of the path computed with inertial data, comparison of tracks acquired in such a way and their association in the continuous map via alignment of those track sections where similar non-inertial data were observed. The advantage of this approach may be more accurate mapping achieved due to analysis and updating of used navigation data. The other advantage of this technique may be practicability of mapping of large indoor environments which are impractical to enter from outside quickly (especially from outdoors). The disadvantage of this technique may be improved but still weak protection against poor quality data, as well as unsolved problem how to detect and correlate coordinates of mapped data. Noisy mapped data with inaccurate reference to the layout when they are linked into a single map may result in higher mapping error. Utilization of such map may result in great positioning errors.

The said application describes the device for positioning of the mobile terminal comprising a set of comparators analyzing isolated flows of inertial and non-inertial data with regard to their recurrence of the same or similar values spread out over some time period and detecting excess of similarity of data of a specific threshold.

In addition, the prior art has a large number of techniques for indoor positioning of the mobile terminal without reference to indoor environment coordinates. Such techniques may include, for example, beacon positioning—Bluetooth Low Energy (BLE), tag positioning—Near Field Communication (NFC), transmitter positioning—Indoor Messaging System (IMES), 2D matrix Quick Response (QR) code positioning. In some cases, an already generated infrastructure may be enough. These techniques do not require mapping, which is their advantage. However, positioning only in individual indoor areas is provided, which together with low positioning accuracy, represents the disadvantages of such techniques.

SUMMARY

The objective of this invention may be the proposed technique for indoor positioning of the mobile terminal, as well as the system for implementation of this technique. A specific feature of the proposed solution is the lack of information given a priori prior to positioning, such as, for example, radio-field and magnetic field indoor distribution map. Mapping of indoor distribution of parameters of physical fields may be implemented directly in the process of proposed positioning technique. Moreover, one of the implementation options of the proposed technique does not require available building layout.

A technical result achieved from the implementation of the proposed technique is preventing the accumulation of mapping error when one mapping data is correlated to another one. Prevention of error accumulation may be provided by referencing mapping data to the local coordinate system associated with positions being adequately identified, the relative position of which is identified with higher accuracy than the relative location between the remaining positions. High accuracy of detection of relative location between positions being adequately identified may be achieved due to statistical averaging of large quantity of data acquired by different users with mobile terminals with inertial sensors of different types. The additional advantage is that availability of the building layout is not required.

An advantage of the proposed system is differentiation between locally mapped indoor sections, implemented by introduction of data storages into the system. Each storage is associated with an adequately identified position and the pattern identifying it or with a group of adequately identified positions or patterns. Due to this, data acquisition is effectively implemented from many users moving indoors with different mobile terminals, as far as data from different users are identified in accordance with the unique pattern and enter appropriate storages, subsequently they jointly participate in farther processing. At that computation costs for implementation of this technique are reduced.

In one embodiment of the mobile terminal indoor positioning technique consists of the following steps: identifying patterns showing a location of the mobile terminal in a specific position while accounting for data obtained from at least one inertial or non-inertial sensor in the process of movement of at least one mobile terminal, detecting and saving the path of movement of the above mobile terminal in the local coordinate system associated with the above position and data obtained from non-inertial sensors; determining statistically averaged parameters for conversion of local systems of coordinates of the mobile terminal into positions detected in the process of its movement; preparing at least one map of distribution of output values of non-inertial sensors on the basis of data obtained during the previous step; and detecting a position of the above mobile terminal on the basis of data obtained during the previous step.

Some embodiments include identifying parameters for conversion of local coordinate system for positions corresponding to the above patterns when statistically averaged parameters for conversion of local coordinates for different pairs of patterns detected in the process of movement of at least one terminal are determined, at that the specified actions may be repeated one and more times.

Some embodiments include preparing at least one map of distribution of output values, for this purpose, coordinates of positions estimated in the local coordinate systems obtained in the process of movement of at least one terminal, may be recomputed into the global coordinate system.

Some embodiments include acquiring a building layout, for this purpose, local positions may be recomputed into the global ones with due account for restrictions imposed by the layout.

Some embodiments include additional updating of estimation of mobile terminal position when more than one pattern identifying location of the mobile terminal in a specific position is detected.

Some embodiments include the pattern identifying a location of the terminal in a specific position and comprising a sequence of measurements over a specific time period.

Some embodiments include the number of local coordinate systems being less than the number of detected patterns.

Some embodiments include combination of positions related to similar patterns into a single section.

Some embodiments include estimation of the position with particle-filters.

Some embodiments include the mobile terminal representing a device capable to supply information and move together with the user.

Some embodiments include the mobile terminal representing a smartphone or a tablet computer, or a notebook or a motor vehicle navigator.

Some embodiments include the inertial sensor representing a gyroscope or an accelerometer.

Some embodiments include the non-inertial sensor representing a magnetometer or a compass or a barometer or a video-sensor or a microphone or a radio-signal receiver.

Some embodiments include this invention to be implemented in the form of mobile terminal indoor positioning device comprising one or more devices for signal processing, one or more devices for data storing, one or more programs, where one or more programs may be stored in one or more devices for data storing and be implemented with one or more processors, at that one or more programs may include the following instructions: detection of patterns identifying location of the mobile terminal in a specific position on the basis of data obtained from at least one inertial or non-inertial sensor in the process of movement of at least one mobile terminal; detection and saving of the path of movement of the above mobile terminal in the local coordinate system associated with the above position and data obtained from non-inertial sensors; determining statistically averaged parameters for conversion of local coordinate systems of the mobile terminal into positions detected in the process of its movement; preparation of at least one map of distribution of output values of non-inertial sensors on the basis of data obtained during the previous step; detection of position of the above mobile terminal on the basis of data obtained during the previous step.

Some embodiments include implementation of this invention in the form of mobile terminal indoor positioning system comprising at least one computer system; at least one coordinate converter associated with the above computer system; one and more data storages associated with at least one coordinate converter; at least one module for detection of patterns associated with one and more above data storages; one and more sensors associated with the above computer system and module for detection of patterns; module for estimation of probability of location of this device in a specific position associated with the above computer system.

Some embodiments include location of one and more data storages and at least one coordinate converter at a remote server or a cloud resource.

Some system embodiments include wireless communication between at least one computer system and at least one module for detection of patterns.

Some system embodiments include wireless communication between system components.

BRIEF DESCRIPTION OF THE DRAWINGS

FIG. 2 explains the patterning process. Path 220 specifying mobile terminal movement in indoor location 221 is shown. Positions 207 and 208, coordinate systems associated with them, 205 and 206, as appropriate, movement directions 209 and 210 are shown. Timeline 200 is shown. Position 207 is shown as unknown position P1 (202) identified with high degree of confidence, position 208—as unknown position P2 (204) identified with high degree of confidence. The mobile terminal identifies its visit to position P1 in time moment $t_1$ (211) and to position P2 in time moment $t_2$ (212). Patterns are measured at these time moments at the output of mobile terminal sensors, as appropriate, $C(t_1)$ identified with 201 and $C(t_2)$ identified with 203. Braces 213 and 214 show sections of mobile terminal movement path in the time interval including pattern detection moment, that is moments $t_1$ (211) and $t_2$ (212).

FIG. 3 explains the process of conversion of local coordinate systems. Path 301, along which the mobile terminal moves, is shown. Locations of the mobile terminal are shown in the successive time moments. Appropriate positions are identified with P1 (304) and P2 (305). Local (Cartesian) coordinate systems 310 and 311 with their centers located in positions P1 and P2, as appropriate, are shown as well. Axes of coordinate system 310 are identified with x (312) and y (313), coordinate system 311 are identified with x' (314) and y' (315). Parameters for change of the origin of coordinates of the second local system in relation to the first one are identified with a (320) and b (321), the angle of rotation of the second local system in relation to the first one—with $\varphi$ (323).

FIG. 5 explains utilization of data storages in mobile terminal positioning system. Sections of mapped indoor environment are shown in the form of three areas: area 503 with local coordinate system 502 associated with well identified position 501, area 506 with local coordinate system 505 associated with well identified position 504, area 509 with local coordinate system 508 associated with well identified position 507. Orientation of local coordinate systems 502, 505 and 508 may be definitely detected in global coordinate system 510. Areas 503, 506 and 509 define approximate differentiation between locally mapped sections of indoor environment. At that the data related to local coordinate system 502 are filed in storage 511, the data related to local coordinate system 505 are filed in storage 512 and the data related to local coordinate system 508—in storage 513.

DETAILED DESCRIPTION

This invention in its different implementation options may be performed in the form of a technique (including technique implemented on a computer), a system, a device or machine-processable medium, containing instructions for implementation of the above technique.

In this invention the device means a computer device, an electronic computer, a computer numeric control (CNC), a PLC (Programmable Logic Controller) and any other devices capable to perform specified, strictly defined sequence of operations (actions, instructions).

The instruction unit means an electronic unit or an integrated circuit (micro-processor) which performs machine instructions.

The instruction unit may read and perform machine instructions (programs) acquired from one or more data storage devices. The functions of data storage device may be implemented, but not limited to, hard disk drives (HDD), flash-drive, read-only memory, solid-state drive (SSD), optical drives.

The program—sequence of instructions designated for implementation of control of a computer or an instruction unit by the device.

The stated mobile terminal indoor positioning technique and its implementation system may be performed in accordance with the below procedure.

The mobile terminal hereinafter means any device capable to move together with the user and supply the information, especially, the information on its location. The example of the mobile terminal may be such devices, as smartphones, tablet computers, mobile phones, notebooks, netbooks, pedestrian and motor vehicle navigators, trackers and similar devices. They may include devices wearable on user's body, among which smart glass (Google Glass), smart watch (for example, Samsung Galaxy Gear), devices for sports and fitness and others may be mentioned.

Regarding indoor positioning, it means positioning inside all facilities, man-made and natural, above-ground and underground, where positioning according to signals from navigation satellite is impractical due to significant signal attenuation inside building walls, ceilings and floorings.

To solve the raised problem, a series of movements of at least one mobile terminal may be performed inside the building proposed for positioning, in their process inertial sensors of the mobile terminal may measure performances of terminal movement and non-inertial sensors of the mobile terminal may measure physical properties of indoor environment. For example, the list of mobile terminal sensors may include inertial sensors (for example, gyroscopes and accelerometers), magnetic field strength sensor (magnetometer), compass, pressure detector (barometer), image sensor (camera), microphone, touch screen, telecommunication and navigation modules, such as WiFi, BLE, NFC, 3G/LTE, GPS/GNSS and others. It is assumed that the mobile terminal is completed with at least a portion of specified sensors and modules, including inertial (for example, an accelerometer and a gyroscope) and non-inertial (for example, WiFi module, magnetometer and other) sensors. This assumption is not limiting one, as far as for example, smartphones and tablet computers generally have the complete package of said sensors.

Outputs of the said sensors and modules may take recording in the process of terminal movements. Should it be inertial sensors, they may include accelerations and angular velocities measured with accelerometers and gyroscopes, as appropriate. Should it be non-inertial sensors, they may include, for example, Receiver Signal Strength Indicator (RSSI) for observed WiFi access points measured by WiFi module, three magnetic field induction vector projections measured by the magnetometer and other values. Measured values required for subsequent utilization may be provided with time stamps stored together with said output sensor values. For example, internal time of mobile terminal processor may be used as the time stamp.

Figure 1:
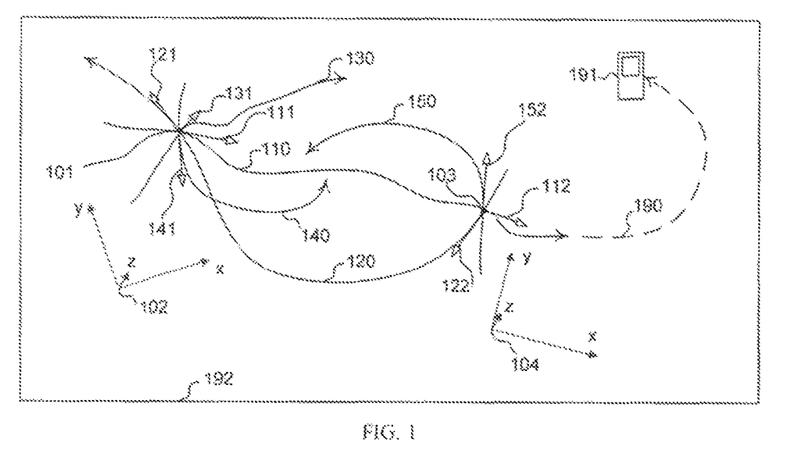
FIG. 1 shows the process of movement of mobile terminal 191 along continuous path 190 in indoor environment 192 to be mapped. In time moments when mobile terminal 191 was located with high degree of confidence in unknown but very well identified positions 101 and 103, directions of its movement have been detected, as well as sections of the path prior and following passage of these positions. In the process of one of such passages, the mobile terminal was moved along path 110 across position 101 in direction 111, and subsequently within the same path section across position 103 in direction 112. In the process of the other passage the mobile terminal was moved along path 120, first across position 103 in direction 122 and then across position 101 in direction 121. In the process of some more passages, the mobile terminal was moved across position 101 along path 130 in direction 131 and along path 140 in direction 141. These path sections do not contain passage across position 103. In the process of one more passage, the mobile terminal was moved across position 103 along path 150 in direction 152. Directions 111, 121, 131, 141, in which the mobile terminal was moved across position 101, as well as mobile terminal movement paths 130, 140, are described in local coordinate system 102 associated with position 101. Directions 112, 122, 152, in which the mobile terminal was moved across position 103, as well as mobile terminal movement path 150, are described in the local coordinate system 104 associated with position 103. Paths 110 and 120 are described both in coordinate system 102 and coordinate system 104.

FIG. 1 shows the process of movement of mobile terminal 191 along continuous path 190 in indoor environment 192. The process of movement of one mobile terminal is shown by way of example only, though in general, more than one mobile terminal may move simultaneously indoors. At that description of positioning process may remain unchanged.

For example, FIG. 1 shows 5 passages along 5 paths (110, 120, 130, 140 and 150), though the number of passages may differ. In the process of one of such passages, the mobile terminal was moved along path 110 across position 101 in direction 111 and subsequently, within the same path section—across position 103 in direction 112. In the process of another passage, the mobile terminal was moved along path 120, first—across position 103 in direction 122, later—across position 101 in direction 121. In the process of some more passages, the mobile terminal was moved across position 101 along path 130 in direction 131 and along path 140 in direction 141. These path sections do not contain passage across position 103. In the process of one more passage, the mobile terminal was moved across position 103 along path 150 in direction 151. Directions 111, 121, 131, 141, in which the mobile terminal was moved across position 101, as well as paths 130, 140 of mobile terminal movement are described in local coordinate system 102 associated with position 101. Directions 112, 122, 152, in which the mobile terminal was moved across position 103, as well as path 150 of mobile terminal movement, are described in local coordinate system 104 associated with position 103. Paths 110 and 120 are described in coordinate system 102 and in coordinate system 104.

In the process of movement of the mobile terminal, patterns $C_k$ allowing for identification of mobile terminal location in a specific position $P_k$ with high degree of confidence, which coordinates in general may be unknown, may be identified with outputs of non-inertial sensors of the mobile terminal, where k may vary within 1 to N range. Hereafter, for convenience of statement only, the following expression, for example, is used: 'location of the mobile terminal in position $P_k$'. As far as position $P_k$ may be identified with define degree of confidence, the above expression, as well as similar expressions may mean that the mobile terminal was actually located within some vicinity to position $P_k$, at that vicinity radius R may depend upon accuracy of detection of well identified position. Specific value R may vary for different applications. For example, for some geo-data services (or Location-Based Services, LBS), value R may make one meter or units of meters. For high accuracy positioning, value R may make units of decimeters or even centimeters. Subsequent description of the proposed technique is applicable to any positioning accuracy.

Patterns allowing for identification of specific indoor location of the mobile terminal with high degree of confidence may have natural origin, but also may be generated artificially. Such patterns may be scalar, for example, the pressure measured by barometer, vector, for example, three-dimensional vector of magnetic field strength obtained from magnetometer output or matrix and even matrix sequences, for example an image or video obtained from camera output. In addition, the pattern may be a sequence of scalar, vector or matrix measurements over the specific time interval. For example, in some locations of indoor environment 192, significant variation of magnetic induction vector may be observed. At that, when mobile terminal 191 moves along path 190 running across definite positions, magnetic induction vector may trace out strictly defined curve different from similar curves obtained when the mobile terminal moves in other indoor environments or in the same location, but along the other path. The unique sequence of values of magnetic induction vector observed in this location may be considered as the signature, definitely showing the sequential passage of definite positions by the mobile terminal.

The other signature example definitely certifying passage through the specific indoor environment area by the user or any other mobile object may be receipt of data unique sequence from small-radius beacon, for example tag NFC. One more example may be the signal of BLE-based radio-beacon, for example iBeacon. Location of the mobile terminal in a specific position may be identified with other positioning radio-beacons, if they are located indoors or outside.

Recording of the specific location of the mobile terminal may be provided with decoding of the QR-code located indoors as a stamp and containing information on location or via identification of identity of the image of the specific indoor environment area. In both cases, images are obtained with mobile terminal camera. One more example of location recording may be loading of the position by the user via mobile terminal touch screen.

Patterns used for detection of different well identified indoor positions may have different physical nature. For example, one well identified indoor position may be detected with unique vector of magnetic field strength, the other position—with NFC signal or QR-code.

Particular patterns may be detected with due account for techniques for detection of patterns known in the literature and stated, for example in Chapter 7, Book Pattern Recognition Principles, authors J. T. Tou, R. C. Gonzàlez, Addison-Wesley, 1977.

After definite time following start of mobile terminal (terminals) movement N of $C_1 \ldots C_N$ patterns may be identified, such patterns that occurrence of $C_k$ pattern in the data obtained from sensors may identify location of the mobile terminal in position $P_k$ with high degree of confidence, where k=1 ... N, and N>=2. At that, position $P_k$ may be unknown in general.

Let's continue to review the example of mobile terminal 191 movement in indoor environment 190. Every time, when the mobile terminal is in position 101 or 103, data specified by appropriate unique pattern are transmitted from mobile terminal sensors. This pattern does not appear when the mobile terminal is located in any other location. FIG. 1 shows by way of example only two well identified positions 101 and 103, though in general their quantity N may be more, i.e. N≥2. In the time moments when mobile terminal 191 was located in unknown, but well identified positions 101 and 103 with high degree of confidence, directions of its movement and sections of the path prior and following passage of these positions have been identified. These values are described in the local coordinate systems, 102 and 104, as appropriate.

Figure 2:
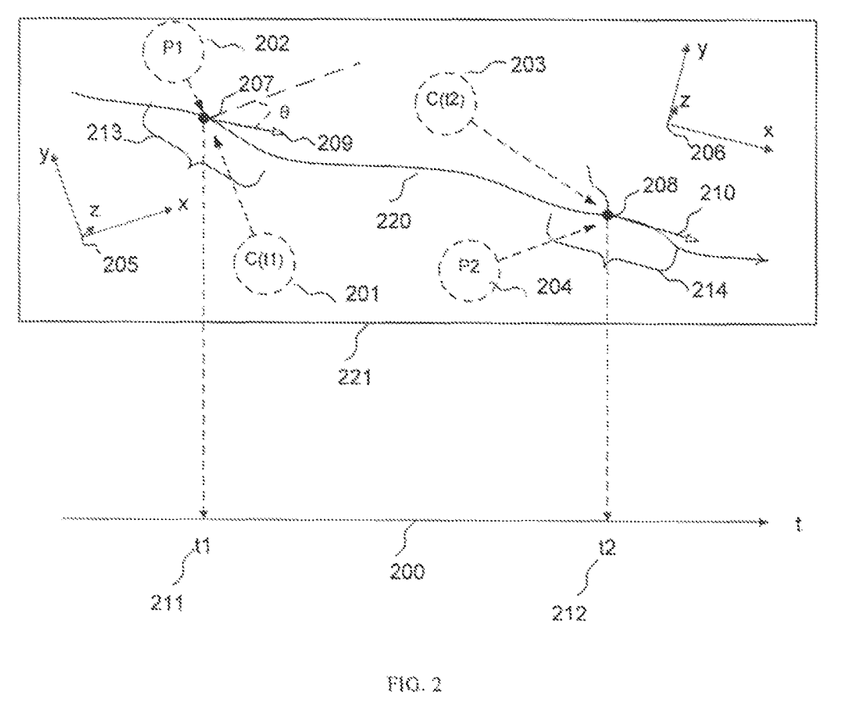

As far as the mobile terminal moves in indoor environment, measurements, acquired from mobile terminal sensors, may be checked with regard to availability of one of patterns $C_1 \ldots C_N$. FIG. 2 shows this process, where path 220 of mobile terminal movement in indoor environment 221 is shown. Case N=2 is reviewed by way of example only, at that, review remains true for general case N>2.

When position 207 is passed in time moment $t_1$ (211), pattern $C(t_1)$ identified with 201 is transmitted from mobile terminal sensors. When position 208 is passed in time moment $t_2$ (212), pattern $C(t_2)$ identified with 203 is transmitted from mobile terminal sensors. Let's suppose by way of example, that modified pattern $C(t_1)$ in time moment $t_1$ has coincided with previously identified pattern $C_1$, and modified pattern $C(t_2)$ in time moment $t_2$ has coincided with previously identified pattern $C_2$. Hence, we may make a conclusion, that mobile terminal position 207 in time moment $t_1$ coincides with previously identified position $P_1$ (202), and mobile terminal position 208 in time moment $t_2$ coincides with previously identified position $P_2$ (204).

Further on, in accordance with data obtained from mobile terminal inertial sensors, the section of mobile terminal movement path 213 and 214 is computed within the time interval, including the moment of pattern detection, $t_1$ and $t_2$, as appropriate. In addition, the direction of 209 and 210 mobile terminal movement at the moment of pattern detection $t_1$ and $t_2$, as appropriate, may be detected. Listed computations may be performed in the local coordinate systems, 205 and 206, as appropriate, for positions $P_1$ and $P_2$. Later, computed path section as well as data obtained from non-inertial sensors at that time may be saved in the storage device.

As an example of the local coordinate system, the cross-shaped X/Y axis may be reviewed hereafter, though review may be performed both for three-dimensional space and for any other system of coordinates, for example, for polar and spherical coordinate systems. The center of local coordinate system associated with well identified position may be located near the specified position, in particular case it may coincide with the specified position. Axes of the local coordinate system are directed in the known way. For example, direction of local coordinate system axe x may coincide with direction of magnetic induction vector in the center of the local coordinate system.

The storage device may be located both on the mobile terminal itself and on remote server or cloud resource. The latter one is reasonable, should more than one mobile terminal move simultaneously in the indoor environment or participate in the described positioning process. In this case, communication between the mobile terminal and the remote storage is implemented via wireless communication line.

Situations may occur when well identified positions are located close to each other. If this is a case, it is not required to associate each position $P_k$ with an individual local coordinate system. Such situation is shown in one of implementation option of the proposed technique, where the number of local coordinate systems may be less than N. In order to associate several positions with the local coordinate system shared by them, similarity of patterns may be identified and for similar patterns several positions $P_k$ are combined in the shared area. For example, all positions around a particular beacon, for example iBeacon, may be combined with a specific identifier into the shared area. Patterns for this examples may be signal strength levels of the above beacon measured in different positions, and criteria of similarity of patterns may consist in excess of some specified value by the signal strength level.

Let's continue description of operation of the proposed system. For different pairs of patterns $C_i$ and $C_j$, i≠j, parameters of shift of local coordinate systems of the mobile terminal in positions $P_i$ and $P_j$ corresponding to identified patterns $C_i$ and $C_j$ may be identified. At first, potential computation of mobile terminal movement path between time moments when sequential detection, at first, of the first pattern and later of the second one, is checked for selected pair of detected patterns. Later, if potential computation is verified, mobile terminal movement path may be computed over the specified time interval in relation to some reference point, and parameters for conversion of the second local coordinate system are defined in accordance with the obtained position in relation to the first local coordinate system.

Let's suppose to be definite, that the mobile terminal is located in position $P_1$ in time moment $t_1$, and in position $P_2$—in time moment $t_2$. The path between $t_1$ and $t_2$, as appropriate, may be computed on the basis of known Dead Reckoning (DR) algorithm in accordance with inertial data. This problem may be solved with more suitable for this problem type of algorithm—Pedestrian Dead Reckoning (PDR).

By way of example let's review in short PDR-based computation of the path section for option N=2. Practicability of computation of the path between points $P_1$ and $P_2$ may be defined on the basis of difference $t_2-t_1$, which may not exceed some allowable value associated with PDR computation error or any other DR implementation option. The simplest algorithm of successive PDR-based computation of the path may look like:

$$x_t = x_{t-1} + l_t \cos(\theta_t) \qquad (1)$$

$$y_t = y_{t-1} + l_t \sin(\theta_t) \qquad (2)$$

where t—time which may be set integer without reduction of generality.

$x_t$ and $y_t$—mobile terminal coordinates computed in the first local coordinate system (102), $l_t$—track length, $\theta_t$—direction (movement direction) in local coordinate system 102.

Track length 4 may be computed on the basis of data obtained from accelerometers and movement direction $\theta_t$ may be estimated on the basis of data obtained from a magnetic compass and gyroscope, as it is described, for example, in Section 10, Book—Principles of GNSS Inertial and Multisensor Integrated Navigation Systems, by P. D. Groves, Artech House, 2008.

Computation on the basis of (1) and (2) equations from time moment $t=t_1$ through time moment $t=t_2$ may allow for expression of coordinates of the local system 206 in coordinates of local system 205, i.e. to find parameters of system 206 displacement in relation to system 205. Let's identify coordinates of position $P_1$ in coordinate system 205 with $(x_{t1}, y_{t1})$ and coordinates of position $P_2$ in the same coordinate system—with $(x_{t2}, y_{t2})$.

Figure 3:
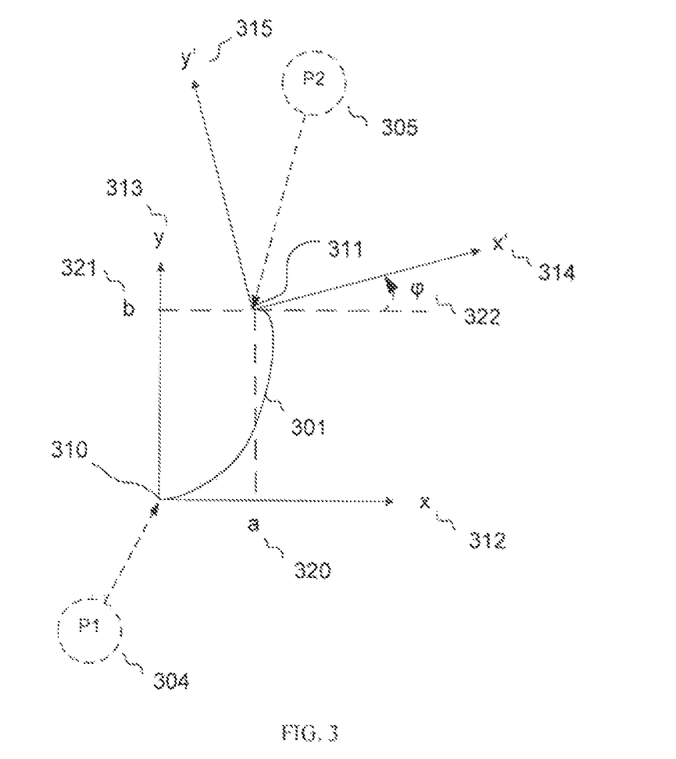

FIG. 3 explains conversion of local coordinate systems. In the reviewed example, conversion of the local coordinate systems is set with parameters of displacement of the second coordinate origin in relation to the first one, a (320) and b (321), as appropriate and the angle of rotation of the second local system in relation to the first one φ (322).

In general, displacement parameters may be expressed from known relations stated, for example, in Section 1.4, Book—Analytical Geometry, World Scientific Publishing by Vaisman I., 1997:

$$a = x_{t2} - x'_{t2} \cos(\varphi) + y'_{t2} \sin(\varphi), \qquad (3)$$

$$a = y_{t2} - x'_{t2} \sin(\varphi) + y'_{t2} \cos(\varphi), \qquad (4)$$

where $x_{t2}$ and $y_{t2}$—coordinates of point $P_2$ in first coordinate system 310, $x'_{t2}$ and $y'_{t2}$—coordinates of point $P_2$ in second coordinate system 311, φ—angle of rotation of the second coordinate system in relation to the first one.

It is convenient to align the center of the local coordinate system with appropriate well identified position. FIG. 3 shows the example appropriate to this case. Then point $P_2$ may be in the center of the second coordinate system 311, where its coordinates are equal to zero or $x'_{t2}=0$, $y'_{t2}=0$. Due to this circumstance, parameters of displacement of the second coordinate system in relation to the first one are expressed without angle of rotation φ with the following simple way:

$$a = x_{t2}, \qquad (5)$$

$$b = y_{t2}, \qquad (6)$$

Angle of rotation φ of the second local coordinate system in relation to the first one may be defined, for example, as the difference between measurements of mobile terminal magnetic compass obtained in time moments $t_2$ and $t_1$.

Later, parameters of conversions (a, b, φ) of the local coordinate systems of mobile terminal may be averaged for track set. Specified averaging may be implemented as follows. Computed parameters of shift of the second coordinate system in relation to the first one may be saved, previously saved displacement parameters for these coordinate systems may be found in the storage device, found and new displacement parameters may be averaged. Hence, coordinates $\hat{x}_k$, $\hat{y}_k$ for positions $P_k$, k=1 ... N may be estimated. One implementation option provides for averaging of data acquired by different users with mobile terminals with different sensors. Due to this, errors of estimation of parameters for conversion of coordinates may be reduced. The other implementation option provides for identification of variety of parameters of mobile terminal sensors and with due account for identified statistics data obtained from the same sensors are averaged. These operations may be performed for each pair of detected patterns from $C_1 \ldots C_N$ set. As a result a set of N points, specified by unique patterns, coordinates of which in relation to each other are known with sufficient degree of confidence, may be identified.

Further on, coordinates of positions $P_1, \ldots, P_N$, estimated in the local coordinate systems may be recomputed into the global coordinate system. The global coordinate system may be, for example, geodetic coordinate system WGS 84. In some applications building coordinate system may be used as the global coordinate system. Let's review potential example of implementation of re-computation into one or other global coordination system.

One of the implementation option is based upon assumption that one or several points from $P_1, P_2, \ldots, P_N$ plurality have known global coordinates. For example, at least one of such points may be located outdoors, due to this global coordinates may be detected with GPS/GNSS receiver included into the mobile terminal. In the other example, global coordinates of one of such points may be detected via identification of the signal transmitted from small-radius radio-beacon, for example from NFC tag or BLE-based radio-beacon, for example iBeacon, provided these radio-beacons are installed indoors. Radio-beacon signal is received by appropriate module (NFC or BLE) of the mobile terminal. One more example is detection of global coordinates one of such points via decoding of QR-code located indoors and containing information on location. QR-code may be read with mobile terminal camera. Following the global coordinates are known at least in one point from $P_1$, $P_2, \ldots P_N$ plural, it may not be difficult to compute global coordinates of remaining points via known relative coordinates.

Due to the above operations saved data obtained from non-inertial sensors together with computed sections of mobile terminal movement paths are in the storage device. At that, as it was shown above, points $P_1, P_2, \ldots P_N$ acquire global coordinates. Local coordinates of path sections running across the specified points are recomputed similarly into global coordinates. Hence, data obtained from non-inertial sensors in different points of movement paths are associated with global indoor coordinates.

The example of data from non-inertial sensors may be magnetic field induction measured with mobile terminal magnetometer. Combination of magnetic field measurements in different indoor environment points is called magnetic map. The other example of data obtained from non-inertial sensors is signal strength (RSSI) from different WiFi access points measured by mobile terminal WiFi module. Combination of measurements of radio-signal strength for different WiFi access points in different points of indoor environment is called WiFi radio-map. Maps of other physical value measured with mobile terminal sensors may be prepared similarly to above examples. Maps acquired with the specified method may be used at subsequent stage of operation of described technique for mobile terminal positioning.

Later, in the process of subsequent movement of the mobile terminal in the same indoor environment, mobile terminal position may be estimated on the basis of measurements of non-inertial sensors and previously prepared maps.

Position estimation may be acquired, for example, with so-called Particle Filter. There is still no steady Russian equivalent for this term, hence, hereafter it is identified with PF (Particle Filter). PF theory is stated in the literature, for example, F. Gustafsson, Particle Filter Theory and Practice with Positioning Applications, IEEE A&E SYSTEMS MAGAZINE Vol. 25, No. 7, July 2010, Part 2, p. 53-81.

PF algorithm essence is as follows. M objects called particles (there is still no steady Russian term, particles or samples may be used) are generated in random. Each particle may be reviewed as an object coordinate, i.e. as a pair of Cartesian coordinate in the reviewed example $(x_t^i, y_t^i)$. Each particle is assigned with weight $w_t^i$, depending upon probability density value for this coordinate. Knowing the movement model, a new set of particles is generated via their movement into the new positions on the basis of inertial sensors. Hence, PF prediction stage is implemented. Subsequently, measurement (for example, Wi-Fi radio-field induction, magnetic field strength, map) is performed and particles weight is corrected (updated) on its basis.

For the above reviewed example, the prediction stage consists of application of object (1) and (2) movement model to each particle, this results in a new set of particles:

$$x_t^i = x_{t-1}^i + l_t^i \cos(\theta_t^i), \quad (7)$$

$$y_t^i = y_{t-1}^i + l_t^i \cos(\theta_t^i), \quad (8)$$

where i—number of particle, i=1, ..., M, $$l_t^i \propto N(l_t, \sigma_{lt}^2)$$

$$\theta_t^i \propto N(\theta_t, \sigma_\theta^2) \quad (9)$$

$N(m, \sigma^2)$—probability density function as per Gaussian law with mean m and dispersion $\sigma^2$.

lt—track length, $\theta_t$—direction (movement direction defined with PDR)
$\sigma_{lt}^2$, $\sigma_\theta^2$,—dispersion of track length and direction.

New weight values are computed at the correction stage:

$$w_t^j = w_{t-1}^j \cdot p(z_t | x_t^i, y_t^i), \; i = 1, \ldots, M, \quad (10)$$

where $p(z_t | x_t^i, y_t^i)$—likelyhood function obtained on the basis of zt measurements, which may be WiFi signal strength, magnetic field strength and other output values of non-inertial sensors.

Then normalization of weights is performed:

$$w_t^i = \frac{w_t^i}{\sum_{i=1}^{M} w_t^i}, \; i = 1, \ldots, M \quad (11)$$

Current estimation of the position is generated, for example, as weighted mean for all particles:

$$\hat{x}_t = \sum_{i=1}^{M} x_t^i w_t^j, \; \hat{y}_t = \sum_{i=1}^{M} y_t^i w_t^j, \quad (12)$$

One more PF specific feature—resambling procedure—known from the literature, for example, from above publication, hence, it is not reviewed here.

Mobile terminal position may be estimated as far as it moves farther in the same indoor environment on the basis of measurements of non-inertial sensors and previously prepared maps. For this purpose, the weights may be corrected in accordance with formula (10), where likelyhood function $$p(z_t | x_t^i, y_t^i)$$

may have, for example the following pattern:

$$p(z_t | x_t^i, y_t^i) = \frac{1}{2\pi\sigma_m^2} e^{-\frac{(x_t^i - f_x(z_t))^2 + (y_t^i - f_y(z_t))^2}{2\sigma_m^2}} \quad (13)$$

where fx (zt), fy (zt)—functions calling back estimations of mobile terminal coordinates on the basis of zt measurement and generated at the previous step of the map of distribution of output values of non-inertial sensors indoors,
$\sigma_m^2$—dispersion of the specified estimation.

The pattern of fx (zt), fy (zt) functions depends upon the specific measurements used for positioning and used estimation method. For instance, for the option of utilization of signal strength measurement RSSI, some methods are known from the literature, for example, A. Kushki, K. Plataniotis, A. Venetsanopoulos, WLAN Positioning Systems, Cambridge University Press, 2012.

One of proposed option implementation provide for additional updating of estimation of mobile terminal position, should one or several patterns C1, . . . , CN be identified in measurements. For example, should Ck pattern allowing for identification of the mobile terminal position in position Pk with high degree of confidence, be detected, position may be updated via reutilization of correction procedure (10). At that the likelyhood function may have, for example, the following pattern:

$$p(z_t | x_t^i, y_t^i) = \frac{1}{2\pi\sigma_c^2} e^{-\frac{(x_t^i - \hat{x}_k)^2 + (y_t^i - \hat{y}_k)^2}{2\sigma_c^2}} \quad (14)$$

where $\hat{x}_k$, $\hat{y}_k$—estimation of position Pk coordinates, previously obtained, $\sigma_c^2$—dispersion of coordinate estimation.

As far as estimation of coordinates $\hat{x}_k$, $\hat{y}_k$ generated with large quantity of data, dispersion of estimation $\sigma_c^2$ may be not high, due to this re-correction (10) with likelyhood function (14) may allow for improvement of positioning accuracy (to reduce estimation dispersion).

One of the proposed system implementation options assumes that the indoor environment layout is available (previously layout availability was not assumed). Should it be such a case, the following additional probability for re-computation of local coordinates of points P1, P2, ... PN into global coordinates, in this case into coordinated of building layout, may appear. The layout imposes restrictions to location of points P1, P2, ... PN, as well as to paths of mobile terminal movement between these points. Restrictions are caused due to availability of walls, crossings of which are prohibited. In additional, several areas of indoor environment, for example, individual rooms, may be inaccessible for visit. Alignment of paths and layout with due account for restrictions allows for locating points P1, P2, ... PN and paths of mobile terminal movement between these points in such a way in order to meet restrictions imposed by the layout, i.e. prevent crossings of walls and visits to inaccessible locations. Following the points are located on the layout in such a way, coordinates of points P1, P2, ... PN become known in layout coordinates. The operation related to alignment of paths and layout with due account for restrictions may be performed with different methods. Let's review, for instance, practicable implementation of alignment of paths and layout with PF.

For example, location of points P1, P2, ... PN and path of mobile terminal movement between these points meeting layout restrictions may be found as a result of sequence of actions described below. At that, let's suppose, to be definite, that displacements of all positions in relation to one of them, for example, positions P2, ... PN in relation to P1, are known. Let's identify the prohibited layout area with W (from English word—wall).

1) To set the initial position of one point, for example, P1, in layout coordinates in allowed layout area. To re-compute coordinates of remaining points P2, ..., PN into layout coordinates.
2) To use prediction equations (7) and (8) for compute mobile terminal movement path from point P1 to any other point, for example, P2. Correction equation (10) may be used, at that the likelyhood function may have the pattern:

$$p(z_t | x_t^j, y_t^j) = \begin{cases} 0, & (x_t^j, y_t^j) \in W \\ 1, & (x_t^j, y_t^j) \notin W \end{cases} \quad (15)$$

The equation (15) takes into account layout restrictions by zeroing the weight of the particle which is trying to cross the wall.
3) To repeat item 2 for other pair of points Pi, Pj.
4) Should zeroing of all weights occur in the process of implementation of items 2 and 3, then to return to item 1 and to set a new initial position for point P1 in layout coordinates.
5) To repeat the preceding items, searching different initial positions of point P1 with an interval. As a result, only those initial positions may remain for which computed paths avoided crossing of walls. The best initial position may be selected, for example, according to the criteria of adjacency of paths estimated with equations (12) for two options: with due account for restriction (15) and without it.

As a result, the initial position of one point in layout coordinates is detected, in relation to which coordinates of all remaining points on the layout become known.

Figure 4:
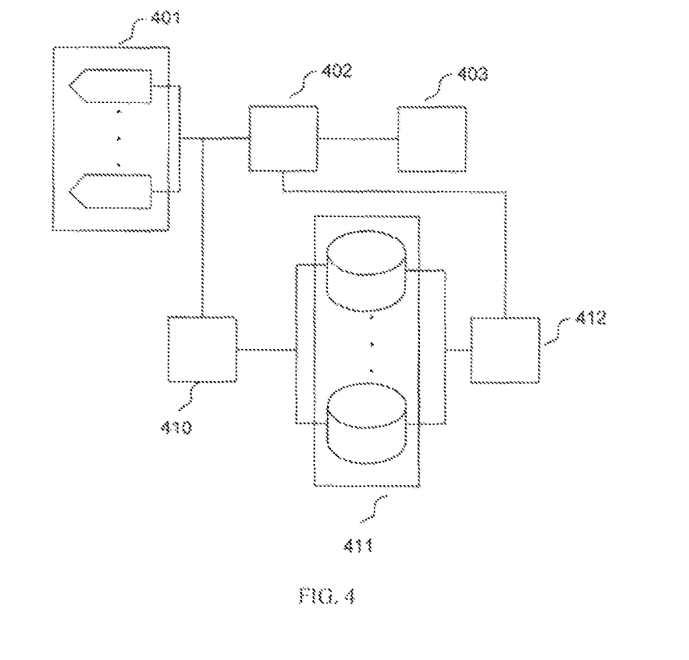
FIG. 4 shows the flow diagram of mobile terminal indoor positioning. The system consists of a plurality of mobile terminals 401 with sensors, computer 402 and probability estimation module 403. In addition, the system includes patterning module 410, data storage 411 and coordinate converter 412.

FIG. 4 shows the flow diagram for mobile terminal indoor positioning system, implementing the above positioning technique. The system operates as follows. A set of sensors 401 measures physical values in the process of mobile terminal indoor movement. Output values of sensors are transmitted to the computer 402 designated for generation of statistical models of sensor measurements in known positions and current measurement in the unknown position. Examples of statistical models of sensor measurements in known positions may be the radio-map described above or magnetic movement map. Should computer 402 successfully simulate the said statistical models, then probability estimation module 403 associated with it may estimate the probability of mobile terminal location in one of the known positions.

As far as initial positions of the mobile terminal are not known in the process of movement, it is required to detect them in order the computer to be capable to implement its task. Pattern selection module 410, data storage 411 and coordinate converter 412 were added into the system for this purpose.

Pattern selection module 410 is associated with a set of sensors 401. This module purpose is detection of such patterns C1 ... CN in output data of sensors which ensure identification of location of the mobile terminal in position Pk with high degree of confidence, when pattern Ck appears in the data obtained from the sensors.

Following identification of patterns, data obtained from sensors are saved in data storage 411, provided, that each storage is associated with one or several patterns Ck and positions Pk.

Figure 5:
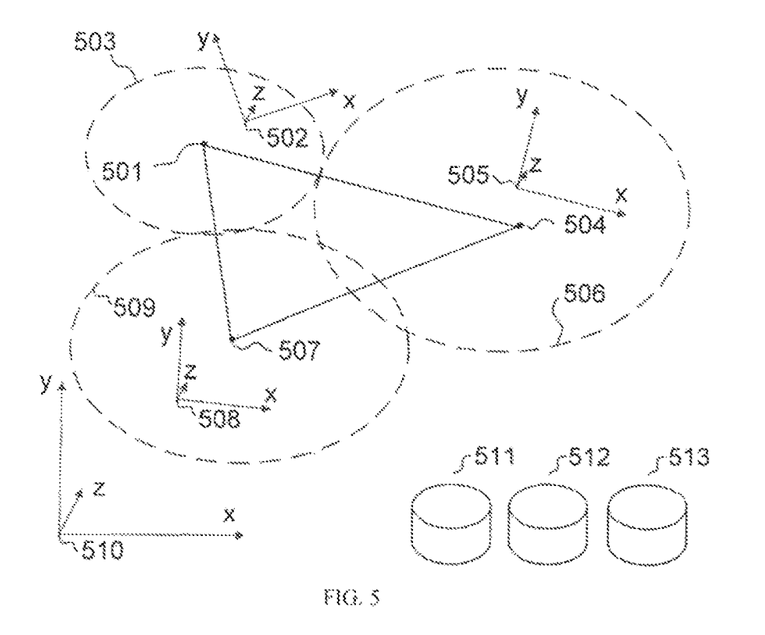

FIG. 5 explains utilization of data storages in the proposed mobile terminal positioning system. Sections of mapped indoor environment are shown in the form of three areas: area 503 with local coordinate system 502 associated with well identified position 501, area 506 with local coordinate system 505 associated with well identified position 504 and area 509 with local coordinate system 508 associated with well identified position 507. Orientation of local coordinate systems 502, 505 and 508 may be definitely defined in the global coordinate system 510. Areas 503, 506 and 509 define approximate differentiation between local mapped indoor environment sections. At that, the data related to local coordinate system 502 are stored in the storage 511, data related to local coordinate system 505 are stored in storage 512 and data related to local coordinate system 508—in storage 513.

Data accumulated in the storage 411 (FIG. 4) are utilized in coordinate converter 412 for conversion of local coordinates and for estimation of global coordinates, as it is described above. As a result, coordinates of positions where output data of sensors are collected may be known. The specified coordinates combined with data are transmitted to computer 402 capable of generating the map of distribution of sensor output data indoors.

Probability computation module 403 performs computations of probability of mobile terminal location in one of the known positions, for example, in line with equations (13) and (14). Data storage 411 and coordinate converter 412 may be located at the mobile terminal, but they also may be located at the remote server or cloud resource. The latter is reasonable, if more than one mobile terminal moves indoors or participates in the positioning process. Should it be the case, communication with pattern selection module 410 and computer 402 may be implemented via wireless communication line. Data storages may be implemented in the form of a portion of operating memory (RAM—Random Access Memory) of the mobile terminal or server depending upon where data storages are located. Mobile terminal processor, for example, of ARM Cortex-Ax type, may be used as a computer. Other computation modules may be implemented with a processor or hardware accelerator of the mobile terminal or the server.

It is evident for this area specialist, that the specific options of implementation of this invention have been described here for the purpose of illustration, different modifications not beyond the scope and invention background scope are allowable.

What is claimed is:

1. A method for mobile terminal indoor positioning, comprising the following steps:
    detecting patterns identifying a location of the mobile terminal in a specific position on the basis of data obtained from at least one inertial and non-inertial sensor along a movement path of at least one mobile terminal for a plurality of specific positions;
    detecting and saving of the mobile terminal movement path in a local coordinate system associated with the above for at least some of each specific position and data acquired from non-inertial sensors;
    determining statistically averaged parameters of conversion between the mobile terminal local coordinate systems for at least some of the specific positions detected along the terminal movement path;
    preparing at least one map of a distribution of output data from the non-inertial sensor on the basis of the statistically averaged parameters; and
    estimating a position of the mobile terminal on the basis of the prepared map;
    wherein the position is estimated with a particle-filter.

2. The method of claim 1, wherein the determination of statistically averaged parameters of conversion between the local coordinate systems for different pairs of patterns detected along the movement path of at least one mobile terminal is repeated one and more times.

3. The method of claim 2 wherein at least one map of distribution of output data is generated, for this purpose coordinates of positions estimated in the local coordinate systems obtained in the process of movement of at least one terminal is re-computed into a global coordinate system.

4. The method of claim 3 wherein a first building layout may be obtained, for this purpose local positions may be recomputed into global ones with due account for restrictions imposed by the layout.

5. The method of any one of claims 1, 2 and 3, wherein more than one pattern identifying location of the mobile terminal in a specific position is detected, further comprising updating the estimation of mobile terminal position.

6. The method of any one of claims 1, 2 and 3, wherein the pattern identifying location of the mobile terminal in a specific position is a sequence of measurements over the specific time interval.

7. The method of claim 1 wherein a number of local coordinate systems is less than a number of identified patterns.

8. The method of claim 7 wherein positions associated with similar patterns are combined into a shared area.

9. The method of claim 8 wherein the mobile terminal is at least one of a smartphone, a tablet computer, a notebook, and motor vehicle navigator.

10. The method of claim 1 wherein the mobile terminal is a device capable to supply information and move together with a user.

11. The method of claim 1 wherein the inertial sensor is a gyroscope or an accelerometer.

12. The method of claim 1 wherein the non-inertial sensor is at least one of a magnetometer, a compass, a barometer, a video-sensor, a microphone, and a radio-signal receiver.

13. A mobile terminal indoor positioning device, comprising:
    one or more instruction units;
    one or more data storage devices;
    one or more programs, wherein the one or more programs are stored on one or more data storage devices and are implemented with one or more processors, wherein the one or more programs comprise instructions for:
    detecting patterns identifying a location of a mobile terminal in a specific position on the basis of data acquired from inertial and non-inertial sensors along a movement path of at least one mobile terminal for a plurality of specific positions:
    detecting and saving the mobile terminal movement path in a local coordinate for at least some of each specific position, as well as data acquired from non-inertial sensor;
    determining statistically averaged parameters of conversion between the mobile terminal local coordinate systems for at least some of the specific positions detected along the terminal movement path;
    preparing at least one map of distribution of output data acquired from the non-inertial sensors on the basis of the statistically averaged parameters; and
    estimating a position of the mobile terminal on the basis of the prepared map data; wherein the position is estimated with a particle-filter.

14. A mobile terminal indoor positioning system, comprising:
    at least one computer system;
    at least one coordinate converter associated with the above computer system; one and more data storages associated with at least one coordinate converter; at least one module for detection of patterns associated with one and more data storages stated above, wherein each module for detection of patterns comprises at least one non-inertial sensor and at least one inertial sensor; and
    a module for computation of probability of location of each module for detection of patterns in a specific position associated with the above computer system; wherein the module for detection of patterns detects patterns identifying a location of the mobile terminal in a plurality of specific positions along a movement path of the module of detection of patterns on the basis of data obtained from the inertial and non-inertial sensors, wherein the module for computation of probability of location detects and saves in the one or more data storages the mobile terminal movement path in a local coordinate system for at least some of each specific position and data acquired from non-inertial sensors, wherein the at least one coordinate converter determines statistically averaged parameters of conversion between the local coordinate systems for at least some of the specific positions detected along the movement path and wherein the module for computation of probability of location further prepares at least one map of a distribution of output data from the non-inertial sensor on the basis of the statistically averaged parameters and estimates a position of the module for detection of patterns on the basis of the prepared map; wherein the position is estimated with a particle-filter.

15. The system of claim 14 wherein one and more data storages and at least one coordinate converter are located at one of a remote server and cloud resource.

16. The system of claim 14 wherein communication between at least one computer system and at least one module for detection of patterns is implemented via wireless communication.

17. The system of claim 14 wherein communication between system components is implemented via wireless communication.

* * * * *